United States Patent
Sadashivaiah et al.

(10) Patent No.: US 6,581,148 B1
(45) Date of Patent: Jun. 17, 2003

(54) SYSTEM AND METHOD FOR ENABLING ADVANCED GRAPHICS PORT AND USE OF WRITE COMBINING CACHE TYPE BY RESERVING AND MAPPING SYSTEM MEMORY IN BIOS

(75) Inventors: Shivaprasad Sadashivaiah, Puyallup, WA (US); William J. Chalmers, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/448,444

(22) Filed: Nov. 24, 1999

Related U.S. Application Data
(60) Provisional application No. 60/111,272, filed on Dec. 7, 1998.

(51) Int. Cl.$^7$ ................................................. G06F 12/00
(52) U.S. Cl. ........................ 711/170; 711/147; 711/154; 713/1; 713/2; 713/100
(58) Field of Search .............................. 709/319, 320, 709/328; 710/22, 23, 52, 56, 74, 308, 310; 711/117, 118, 121, 122, 129, 130, 138, 144, 147, 153, 154, 170, 171, 172, 173; 713/1, 2, 100

(56) References Cited

U.S. PATENT DOCUMENTS

| | | | | |
|---|---|---|---|---|
| 5,794,069 A | * | 8/1998 | Chisholm et al. | 710/2 |
| 5,914,730 A | * | 6/1999 | Santos et al. | 345/531 |
| 5,999,743 A | * | 12/1999 | Horan et al. | 710/56 |
| 6,105,119 A | * | 8/2000 | Kerr et al. | 711/219 |
| 6,446,213 B1 | * | 9/2002 | Yamaki | 713/300 |

OTHER PUBLICATIONS

"Write Combining Memory Implementation Guidelines," Nov. 1998, pp. 1–17.

* cited by examiner

Primary Examiner—Do Hyun Yoo
Assistant Examiner—Christian P. Chace
(74) Attorney, Agent, or Firm—Kenyon & Kenyon

(57) ABSTRACT

The present invention relates to using memory in a computer. In particular, the present invention relates to allocating a portion of computer-system memory as a cache, making the allocated portion accessible to device drivers and hiding the allocated memory portion from the operating system. In one embodiment of the present invention, an amount of system memory is allocated for use as a direct memory access ("DMA") buffer. The allocated memory is mapped as write combining, and this write combining memory is made available to a device driver.

20 Claims, 4 Drawing Sheets

SYSTEM AND METHOD FOR ENABLING ADVANCED GRAPHICS PORT AND USE OF WRITE COMBINING CACHE TYPE BY RESERVING AND MAPPING SYSTEM MEMORY IN BIOS

CROSS-REFERENCE TO RELATED PATENT APPLICATIONS

This patent application claims the benefit of U.S. Patent Provisional Application Ser. No. 60/111,272 entitled Enabling AGP and Use of WC Cache by Reserving and Mapping System Memory in BIOS, filed Dec. 7, 1998.

FIELD OF THE INVENTION

Embodiments of the present invention relate to using memory in a computer. In particular, the present invention relates to allocating a portion of computer-system memory as a cache and mapping the allocated memory portion as reserved memory that can not be accessed by the operating system.

BACKGROUND

With today's high-performance microprocessors, a popular technique for using memory involves caching. Typically, a memory cache interposes a block of fast memory, for example, high-speed Dynamic Random Access Memory ("DRAM"), between the microprocessor and a main memory. A special circuit called a cache controller attempts to keep the cache filled with the data or instructions that the microprocessor is likely to need next. If the information the microprocessor requests next is held within the DRAM of the cache, it can be retrieved without wait states. If, however, the information is not held in the DRAM of the cache, then the information can only be retrieved with wait states.

The logical configuration of a cache involves how the memory in the cache is arranged and how it is addressed, that is, how the microprocessor determines whether needed information is available inside the cache. The microprocessor is not the only component that can benefit from caching. For example, the graphics card, the component that writes graphics to the screen, can also benefit from caching.

FIG. 1 is an overview of a prior-art memory allocation. This figure shows that caches differ in the way they treat writing to memory. Most caches make no attempt to speed up write operations. Instead, they push write commands through a cache immediately, writing to cache and main memory at the same time. This write-through cache design guarantees that main memory and cache are in constant agreement. There is a faster alternative, however, called a write-back ("VWB") memory 101. This WB memory 101 allows the microprocessor 100 to write changes to its cache memory and then immediately go back about its work. In FIG. 1, the microprocessor 100 has two cache memories, an on-die level 1 cache 106 which is integrated with the microprocessor 100, and a level 2 cache 107 that is external to the microprocessor 100.

One problem with the WB memory 101 is that a main memory 102 and the microprocessor level 1 and level 2 cache memories 106 and 107, respectively, can have different contents assigned to the same memory locations. The level 1 and level 2 caches 106 and 107, respectively, of the microprocessor 100 must constantly be checked to ensure that the contents of the main memory 102 properly track any changes made in the level 1 and level 2 caches 106 and 107, respectively. This constant checking is called "snooping," and slows performance. The overhead associated with snooping is called "latency" and latency reduces the performance of the machine. For example, if the microprocessor 100 asks for one megabyte ("MB") of data that is marked as WB memory, chipset 104 will check both the WB memory 101 and the level 1 and level 2 caches 106 and 107, respectively, to see if the memory in WB memory 101 is up to date.

An existing solution to this problem is to use what is called a write-combining ("WC") memory 105 as shown in the prior art system in FIG. 1. The WC memory 105 is a weakly ordered memory type in which system memory locations are not cached and coherency is not enforced by the processor's bus-coherency protocol. When data is requested from the WC memory 105, the chipset does not snoop; that is, the chipset does not check to see if the memory is up to date, it simply reads the information stored in the WC memory 1 OS. However, a problem with WC memories is that WC memories are not always large enough to be useful to and are not always available to the various device drivers running on the computer.

In FIG. 1, a graphics accelerator/video controller 103 is shown, and is one of the most important chips on a video board. Graphics accelerators/video controllers can be designed to use standard DRAM, dual-ported video random access memory ("VRAM"), or either type. While VRAM memory delivers better performance, it is more expensive than DRAM. Therefore, if performance can somehow be enhanced using DRAM, for example, by enabling the graphic accelerator/video controller 103 to store and retrieve information directly from a high speed DRAM cache in main memory 102, a machine will be able to provide better performance at a lower price.

Therefore, it can be appreciated that a substantial need exists for a system and method which can advantageously use computer system memory DRAM as a high speed cache that is accessible to the various device drivers running on the computer system.

SUMMARY OF THE INVENTION

To overcome the problems in the prior art, a system and method is introduced for allocating system memory as a cache that is accessible to various peripherals. In one embodiment of the present invention, an amount of system memory is allocated for use as a Direct Memory Access ("DMA") buffer. The allocated memory is mapped as write combining, and the write combining memory is made available to a device driver.

DETAILED DESCRIPTION

Embodiments of the present invention relate to using memory on a computer. In particular, the present invention relates to allocating a portion of computer-system memory as a cache and hiding the allocated memory portion from the operating system ("OS"). Since the present invention is not OS specific, separate embodiments of the present invention are not contemplated for each individual OS.

Figure 1:
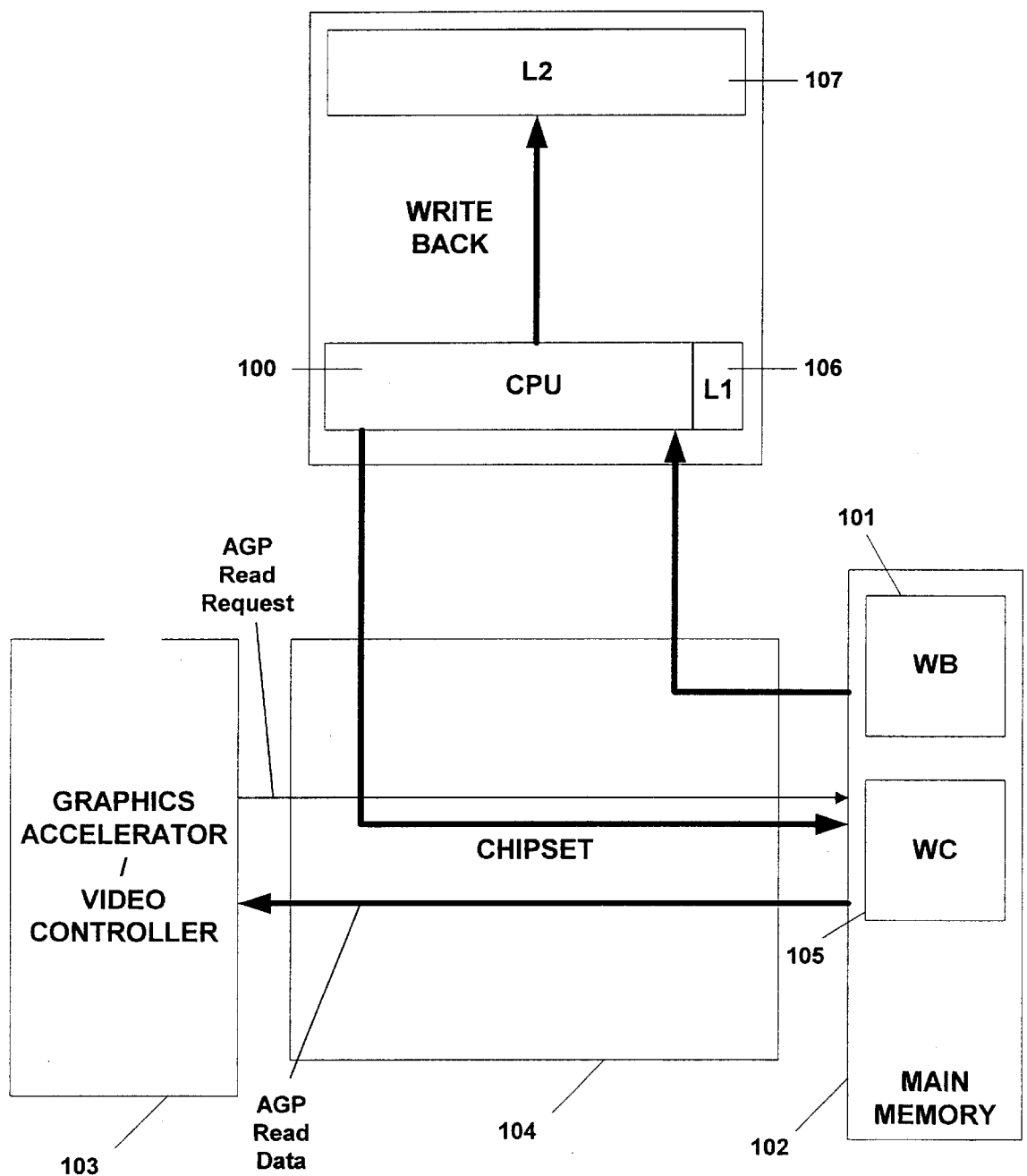
FIG. 1 is a diagram of an overview of a prior art computer system using both write-back to and write-combining memories.
Figure 2:
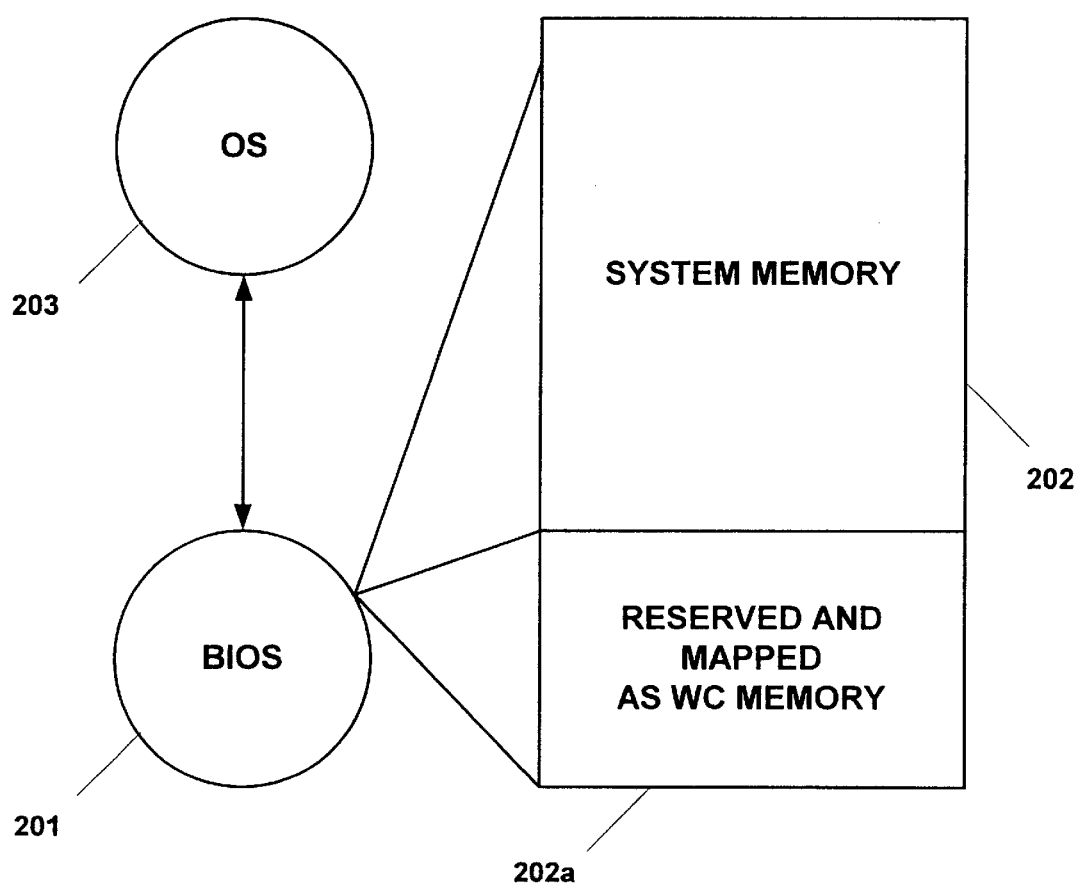
FIG. 2 is a diagram of a system overview of an embodiment of the present invention showing a portion of a system memory to be reserved and mapped as a write-combining memory.

Turning to the figures, FIG. 2 illustrates a system overview of an embodiment of the present invention. In this embodiment, during the boot procedure, a Basic Input Output System ("BIOS") 201 uses software interrupt calls to reserve a portion of a system memory 202 and map this reserved portion as a WC memory 202a using memory type range registers ("MTRRs"). The BIOS 201 completes the boot procedure and prevents the operating system 203 from accessing the WC memory 202a by specifying in the MTRRs the addresses for the WC memory 202a are not accessible. The WC memory 202a is now available for use by device drivers.

In an embodiment of the present invention a graphics card (not shown) uses 4 MB of memory which is local to the graphics card, the BIOS 201 allocates a piece of system memory 202 as the WC memory 202a and makes the WC memory 202a available to the graphics card. If the graphics card needs more than 4 MB, and it uses a bus, such as an Advanced Graphic Port ("AGP"), Intel AGP Interface Specification, Revision 2.0, published May 4,1998, the graphics card can access, at relatively high speed, system memory to satisfy the need for extra memory.

In an embodiment of the present invention the system has the ability to do relatively high speed DMA. To write and display, for example, texture maps using the present invention, the AGP can ask for memory directly without accessing the central processing unit ("CPU"). Because the WC memory 202a uses DMA, this operation saves on the overhead cost of snooping, or checking the CPU primary cache since there is nothing in the processor's primary cache that might have modified the data stored in the WC memory 202a.

Figure 3:
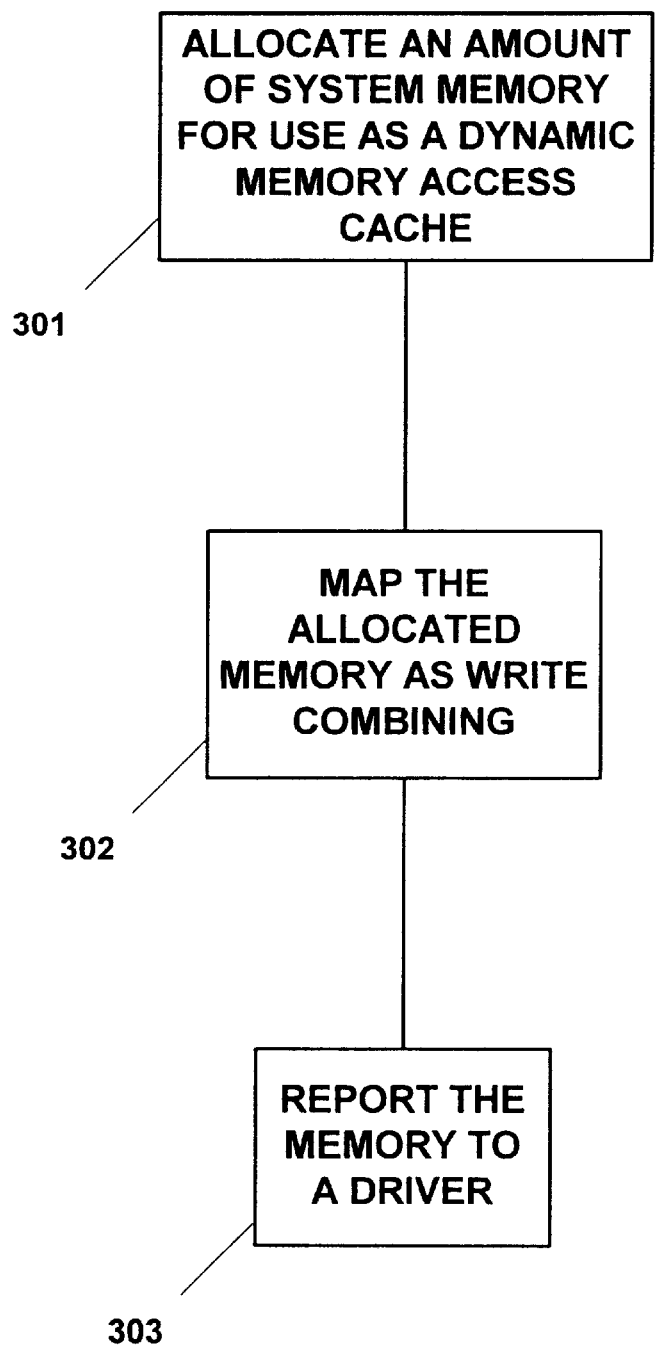
FIG. 3 is a flow chart that illustrates a method for allocating and mapping the portion of system memory as write-combining of an embodiment of the present invention.

FIG. 3 is a flow chart of an embodiment of the present invention. In this embodiment, in Step 301, an amount of system memory is allocated for use as a DMA cache. At Step 302, the allocated memory is mapped as a WC memory, and at Step 303, this memory is made available to a driver.

For example, in an embodiment of the present invention, a computer includes a graphics card which writes graphics to the screen over an AGP bus (not shown) to boost graphics performance. To accomplish this, we force the OS (for example in one embodiment, Windows NT® 4.0) to accept the AGP, even though the OS is not designed to accept the AGP, and implement the WC memory 202a. Windows NT® 4.0 is produced by Microsoft Corporation of Redmond Wash. Therefore, in FIG. 2, when the OS 203 boots up, the OS 203 looks at whatever memory is available, and sees that it has whatever it normally has less the amount reserved as WC memory 202a. Once the OS 203 boots up, the OS 203 is informed by the BIOS of the total size of the system memory 202, however, the OS 203 does not have any control over nor is the OS 203 able to access the WC memory 202a. For example, in an embodiment of the present invention having a system memory 202 with 128 Megabytes ("MB") of total system memory and 8 MB reserved as WC memory 202a, the OS 203 is informed of the 128 MB of total system memory 202, but, is only able to access the 120 MB not mapped as WC memory 202a.

In an embodiment of the present invention, after the memory is mapped by the BIOS 201 as WC memory 202a, the OS 203 is called to determine how much memory is available and the OS 203 is then told that some part of the memory, that is, the WC memory 202a, is reserved and not available for use by the OS 203. For example, if we assume that the system memory 202 has 64 MB and the BIOS 201 maps 1 MB from the OS 203, then, the OS can only access 63 MB. The 1 MB was used as a buffer for the AGP card.

In FIG. 3, the allocation in step 301 is performed by the BIOS 201 during the boot-up procedure. In an embodiment of the present invention, the BIOS 201 allocates system memory by determining how much memory is desired and by determining from where the memory will be reserved, when the OS 203 loads and calls software interrupt 15h function E820h to retrieve the system memory map information. In this software interrupt call, the BIOS 201 will reserve a part of the system memory and prohibit the OS 203 and programs from accessing the reserved system memory using at least one MTRR to map the reserved memory as an Unspeculating Write-Combining ("USWC") memory cache. In an embodiment in accordance with the present invention, for example, in a Pentium Pro processor system, there are only eight (8) MTRRs which are available to be used by the processor and ideally no less than two (2) should be available for the OS 203. Therefore, the BIOS 201 can use a maximum of six (6) MTRRs, to map the WC memory 202a.

In an embodiment of the present invention, to determine the size of the allocated memory, or cache, the BIOS uses 3 bits of a CMOS byte. The value of the CMOS byte, n, varies from 0 to 7, where a value of 0 means that the feature is disabled, and a value between 1 and 7 indicates the size in MB to be reserved, calculated as $2^{(n-1)}$. For example, if n=4, this would reserve $2^{(4-1)}=2^3=8$ MB of system memory. Therefore, in this embodiment of the present invention, the maximum possible amount of system memory that can be reserved as the USWC memory is 64 MB for a value of n=7.

In an embodiment of the present invention, to determine the location of the allocated memory, or cache, the information identifying the memory to be reserved is stored in a specific CMOS location, with the byte location defined in Table 1 as follows:

TABLE 1

| 7 | 6 | 5 | 4 | 3 | 2 | 1 | 0 |
|---|---|---|---|---|---|---|---|
| n/a | n/a | n/a | n/a | n/a | x | x | x |

The CMOS location is fixed for a platform, and is defined in the following System Management BIOS ("SMBIOS") structure mask byte. Having a constant value makes the location uniform across different platforms for easy access by a device driver. The SMBIOS structure is an Original Equipment Manufacturer ("OEM") specific SMBIOS Structure of type 90h. The SMBIOS structure types 80h-FFh are reserved for OEM specific types. In an embodiment of the present invention, the SMBIOS Structure is of the following format:

```
typedef struct reserved_memory
    BYTE    type;        //Structure type
    BYTE    length;      //Length of the structure
    WORD    handle;      //Structure's handle
    BYTE    CMOSByte;    //CMOS byte index
    BYTE    mask;        //A mask byte to indicate which 3
                         bits in CMOSByte to use
```

-continued

| | | |
|---|---|---|
| BYTE | CMOSTop; | //CMOS top index for checksum calculation |
| BYTE | CMOSBottom; | //CMOS bottom index for checksum calculation |
| BYTE | checkSumLocation; | //CMOS index for checksum location |
| BYTE | resSize; | //The actual reserved memory in the same format as CMOSByte |
| DWORD | startPhyAdd; | //Starting physical address of the reserved memory |
| BYTE | reserved[2]; | //Reserved for Future use |
| } RESERVED_MEMORY; | | |

The identity of this structure is based on 'type=90h' and 'length=16'. The device driver will use the CMOSByte index value to read and write the CMOS ports [70h for index and 71h for read/write]. The device driver reads the value at the CMOSByte index at load time to check for the existence of the reserved memory. The resSize field indicates the actual memory reserved by the BIOS 201. The device driver can modify the CMOSByte index value by writing the value between 0–7 in order to change the size of the memory to be reserved. When the CMOSByte index value is modified, the device driver also updates the checksum value at index, checkSumLocation.

Continuing with FIG. 3, in step 302, the allocated memory is mapped by the BIOS 201 as write combining and program MTRRs are set to prevent the OS 203 or any programs from accessing the WC memory 202a. In step 303, the availability of the WC memory 202a is reported to a device driver such as a graphics driver. In an embodiment of the present invention, the SMBIOS defines the CMOS location of the cache and makes the location uniform across different platforms to enable access by the device driver. In another embodiment of the present invention, the SMBIOS is used to convey information to the device driver.

Figure 4:
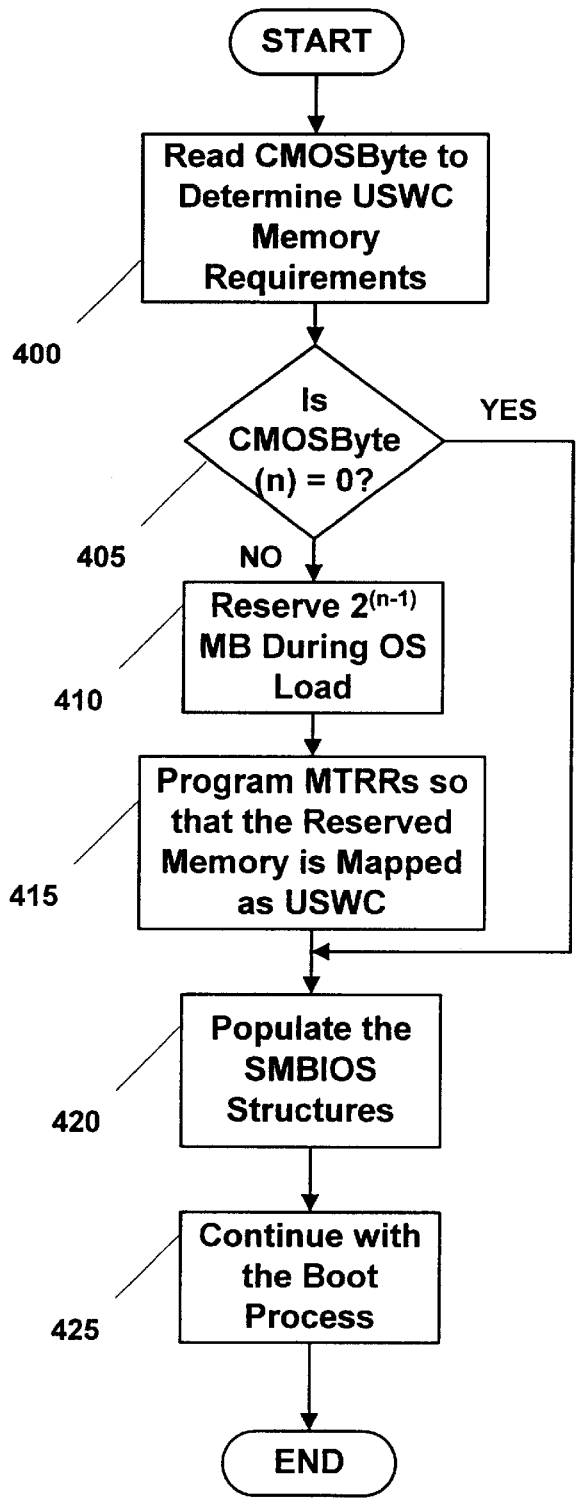
FIG. 4 is a flow chart showing a Basic Input Output System (BIOS) solution to reserve and map a specified portion of a system memory as write-combining in an embodiment of the present invention.

FIG. 4 is a flowchart of an embodiment of the present invention showing the BIOS solution. In the BIOS solution, if the CMOSByte is not in the checksum area, the other top, bottom, and checksum index fields may not be required and are set to zero. When these values are zero, the device driver will not calculate and update the checksum whenever the CMOSByte value is modified. Therefore, in accordance with one embodiment of the present invention, the BIOS boot process is shown in FIG. 4. In step 400, as the system starts up, the BIOS 201 reads the CMOS byte to determine how much memory is to be reserved. In step 405, if the CMOS byte contains a zero value, then processing goes to step 420, otherwise, processing continues with step 410. In step 410, the system reserves the size requested in the Interrupt 15h function E820h call during the BIOS 201 load. In step 415, the system programs the MTRRs so that the reserved memory is mapped as an USWC memory. In step 420, the system populates the SMBIOS structures with the above information. "Populate" means to "set" the values in the SMBIOS structure. In step 425, the system continues with the boot process.

In accordance with an embodiment of the present invention, a sample Kernel Mode Driver reads and writes to the CMOSByte index location in order to enable, disable and size the memory to be reserved. Additionally, the sample Kernel Mode Driver accesses the SNIBIOS structures, such as the reserved_memory structure, and obtains all the information regarding total system memory and reserved memory. Similarly, vendor supplied graphics drivers will use Application Program Interface ("API") Input-Output Controls ("IOCTLs") to use the feature to access the reserved memory and it's virtual starting address.

In accordance with an embodiment of the present invention, the sample Kernel Mode Driver initializes the memory size to be reserved (with a default of 8 MB) and compares the reserved size against the one in the CMOSByte index location exported via the SMBIOS structure. If the required value is different from the one stored in the CMOSByte index location, the required value is written to the CMOSByte index location. The system must be restarted in order for the new CMOSByte index location value to become effective in the BIOS. Following the system restart the requested memory is mapped as USWC and the graphics driver can now call the APIs to access the reserved memory.

Embodiments of the present invention advantageously allow portions of main system memory to be mapped as a WC memory type, prevent the OS form being able to access the WC memory, and make the WC memory equally available to system device drivers.

In accordance with an embodiment of the present invention, a computer system includes a bus for communicating data and control signals, which is separately coupled to a processor and a system memory. The computer system further includes a basic input output system (BIOS) for providing a basic set of instructions for booting up the computer system, which, when executed by the processor, allocate an amount of the system memory for use as a direct memory access (DMA) buffer; map the allocated system memory as write combining; and report the allocated system memory to a device driver. The computer system further includes an operating system for providing a set of instructions for controlling the computer system, which, when executed by the processor, determine the amount of system memory available for use by the operating system. Allocating the system memory as a DMA buffer includes determining how much of the system memory is desired; and determining from where the system memory will be reserved. Further, determining how much of the system memory is desired involves reading a CMOSByte and a mask from a reserved memory structure at system startup; using the mask to determine which bits to read from the CMOSByte; determining a value by reading the bits specified by the mask in the CMOSByte; and calculating the amount of the system memory to be reserved using the value. Further, calculating the amount of the system memory to be reserved involves calculating $2^{(n-1)}$, where n is the value. Further, mapping the allocated system memory as write combining involves preventing the operating system from accessing the allocated system memory by using software interrupt 15h function E820h; and programming memory-type range registers to map the allocated system memory as write combining. The computer system may further include a graphics controller that is connected to the bus for direct memory access of the write combining memory.

In the foregoing detailed description, apparatus and methods in accordance with embodiments of the present invention have been described with reference to specific exemplary embodiments. Accordingly, the present specification and figures are to be regarded as illustrative rather than restrictive and all such implementations which fall within the spirit and the broad scope of the appended claims will be embraced by the principles of the present invention.

What is claimed is:

1. A method comprising:

allocating an amount of system memory for use as a direct memory access (DMA); buffer comprising:

determining how much of the system memory is desired comprising:
reading a byte and a mask from a reserved memory structure at system startup;
using the mask to determine which bits to read from the byte;
determining a value by reading the bits specified by the mask in the byte; and
calculating the amount of system memory to be reserved using the value;
determining from where the system memory will be reserved;
mapping the allocated system memory as write combining; and
reporting the allocated system memory to a device driver.

2. The method of claim 1, wherein said byte comprises:
a CMOSByte.

3. The method of claim 1, wherein said calculating the amount of the system memory to be reserved comprises:
calculating $2^{(n-1)}$, where n is the value.

4. The method of claim 1, wherein said mapping the allocated system memory as write combining comprises:
preventing the operating system from accessing the allocated system; and
programming memory-type range registers to map the allocated system memory as write combining.

5. A machine-readable medium having stored thereon a plurality of executable instructions to perform a method comprising:
allocating an amount of system memory for use as a direct memory access (DMA); buffer comprising:
determining how much of the system memory is desired comprising:
reading a byte and a mask from a reserved memory structure at system startup;
using the mask to determine which bits to read from the byte;
determining a value by reading the bits specified by the mask in the byte; and
calculating the amount of system memory to be reserved using the value;
determining from where the system memory will be reserved;
mapping the allocated system memory as write combining; and
reporting the allocated system memory to a device driver.

6. The computer-readable medium of claim 5, wherein said byte comprises:
a CMOSByte.

7. The computer-readable medium of claim 5, wherein said calculating the amount of the system memory to be reserved comprises:
calculating $2^{(n-1)}$, where n is the value.

8. The computer-readable medium of claim 5, wherein said mapping the allocated system memory as write combining comprises:
preventing the operating system from accessing the allocated system memory; and
programming memory-type range registers to map the allocated system memory as write combining.

9. A computer system comprising:
a bus;
a processor coupled to said bus;
a system memory coupled to said bus;
a basic input output system (BIOS) for providing a basic set of instructions for booting up the computer system, said instructions being executable to perform a method comprising:
allocating an amount of system memory for use as a direct memory access (DMA); buffer comprising:
determining how much of the system memory is desired comprising:
reading a byte and a mask from a reserved memory structure at system startup;
using the mask to determine which bits to read from the byte;
determining a value by reading the bits specified by the mask in the byte; and
calculating the amount of system memory to be reserved using the value;
determining from where the system memory will be reserved; and
an operating system to provide a set of instructions for controlling the computer system, said instructions being executable to perform a method comprising:
determining the amount of system memory available for use by the operating system.

10. The computer system of claim 9, wherein said byte comprises:
a CMOSByte.

11. The computer system of claim 10, wherein said calculating the amount of the system memory to be reserved comprises:
calculating $2^{(n-1)}$, where n is the value.

12. The computer system of claim 9, wherein said mapping the allocated system memory as write combining comprises:
preventing the operating system from accessing the allocated system memory; and
programming memory-type range registers to map the allocated system memory as write combining.

13. The computer system of claim 9 further comprises:
a graphics controller connected to said bus for direct memory access of said write combining memory.

14. A machine-readable medium encoded with a data structure comprising:
a reserved memory structure to store:
a structure type value to specify a system management basic input output system (SMBIOS) structure;
a structure length value to specify the length of the SMBIOS structure specified by the structure type value;
a structure handle value of the SMBIOS structure specified by the structure type value;
a predetermined byte value to specify whether and how much reserved memory is in use;
a mask byte for specifying which bits of the byte value to use to determine whether and how much reserved memory is in use;
a top index value to use in checksum calculations if reserved memory is in use;
a bottom index value to use in checksum calculations if reserved memory is in use;
a index value to specify a checksum value to use in checking the checksum calculations if reserved memory is in use;
a reserved memory size value which specifies the actual reserved memory in use;
a starting physical address value to specify the starting physical address of the actual reserved memory in use; and a reserved value for future use.

15. The machine-readable medium of claim 14, wherein the structure type value is 90h.

16. The machine-readable medium of claim 14, wherein the length of the structure value is 16 bytes.

17. The machine-readable medium of claim 14, wherein the byte comprises:

a complimentary metal-oxide semiconductor (CMOS) byte.

18. The machine-readable medium of claim 14, wherein the top index value comprises:

a complimentary metal-oxide semiconductor (CMOS) top index value.

19. The machine-readable medium of claim 14, wherein the bottom index value comprises:

a complimentary metal-oxide semiconductor (CMOS) bottom index value.

20. The machine-readable medium of claim 14, wherein the index value comprises:

a complimentary metal-oxide semiconductor (CMOS) index value.

* * * * *